United States Patent
Ryan et al.

(10) Patent No.: US 12,449,477 B2
(45) Date of Patent: Oct. 21, 2025

(54) APPARATUSES AND METHODS FOR JITTER MEASUREMENT

(71) Applicant: Analog Devices International Unlimited Company, Limerick (IE)

(72) Inventors: Seamus Anthony Ryan, Nenagh (IE); Pablo Ventura, Museros (ES); Guillermo Oliver, Valencia (ES)

(73) Assignee: Analog Devices International Unlimited Company, Limerick (IE)

( * ) Notice: Subject to any disclaimer, the term of this patent is extended or adjusted under 35 U.S.C. 154(b) by 9 days.

(21) Appl. No.: 18/510,224

(22) Filed: Nov. 15, 2023

(65) Prior Publication Data

US 2025/0155499 A1    May 15, 2025

(51) Int. Cl.
*H04L 7/00* (2006.01)
*G01R 31/317* (2006.01)

(52) U.S. Cl.
CPC . *G01R 31/31709* (2013.01); *G01R 31/31713* (2013.01); *G01R 31/31727* (2013.01)

(58) Field of Classification Search
CPC ........ G01R 31/31709; G01R 31/31713; G01R 31/31727; H03L 7/00; H03L 7/06; H03L 7/08; H04B 3/46; H04B 17/00; H04L 7/00; H04Q 1/20
USPC ........... 327/91, 147, 156; 348/548; 375/219, 375/224, 226, 295, 316, 326, 371
See application file for complete search history.

(56) References Cited

U.S. PATENT DOCUMENTS

| | | | | |
|---|---|---|---|---|
| 6,760,389 | B1* | 7/2004 | Mukherjee | H03L 7/18 375/326 |
| 2006/0007828 | A1* | 1/2006 | Kadowaki | G01R 31/312 369/53.18 |
| 2007/0157057 | A1 | 7/2007 | Hess et al. | |
| 2008/0272810 | A1* | 11/2008 | Edwards | H03L 7/0994 327/156 |
| 2012/0056769 | A1* | 3/2012 | Wang | G04F 10/005 341/166 |
| 2012/0147267 | A1* | 6/2012 | Ryan | H04N 5/46 348/521 |
| 2013/0332096 | A1 | 12/2013 | Sanduleanu | |

(Continued)

OTHER PUBLICATIONS

Extended European Search Report received for Patent Application No. 24212129.1, Mailed on May 7, 2025, 8 Pages.

*Primary Examiner* — Shawkat M Ali
(74) *Attorney, Agent, or Firm* — ArentFox Schiff LLP

(57) ABSTRACT

Aspects of the present disclosure include a method, a switch, and/or a computer readable medium for analyzing a window of samples at an expected position of a plurality of input edges of a plurality of input waveforms, detecting the plurality of input edges, measuring a displacement of each input edge, with respect to a previous position, of the plurality of input edges, generating a value of the displacement of each input edge, incrementing a corresponding counter value of a plurality of accumulator values in response to each value of the displacement of a corresponding accumulator of the plurality of accumulators, normalizing the plurality of accumulator values, generating the plurality of accumulator values, summing the plurality of accumulator values output by the plurality of accumulators to generate an accumulated jitter value, and sending jitter result information based on the accumulated jitter value.

20 Claims, 9 Drawing Sheets

(56) References Cited

U.S. PATENT DOCUMENTS

2019/0086471 A1    3/2019  Aouini et al.
2019/0312573 A1   10/2019  Aouini et al.
2021/0384917 A1*  12/2021  Ishimi .................. H04L 1/0061

* cited by examiner

APPARATUSES AND METHODS FOR JITTER MEASUREMENT

BACKGROUND

In a computer network, various network devices may transmit and/or receive signals to and/or from each other. However, there are many factors that may degrade the quality of the signals, such as electromagnetic interference, defects in the interconnecting cables, poor designs, loose connections, etc. Being able to measure the degradation of the quality of the signals may alleviate some of the degradations by providing appropriate countermeasures. Yet, improvements to network signal measurement are desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include a circuit for measuring jitter including an edge detector circuit configured to detect a plurality of input edges of a plurality of input waveforms, a movement counter circuit configured to analyze a window of samples at an expected position of the plurality of input edges, measure a displacement of each input edge, with respect to a previous position, of the plurality of input edges, and output a value of the displacement of each input edge, a plurality of accumulators each configured to increment a corresponding counter value of a plurality of accumulator values in response to each value of the displacement of a corresponding accumulator of the plurality of accumulators, and output the plurality of accumulator values, and a summation circuit configured to sum the plurality of accumulator values output by the plurality of accumulators to generate an accumulated jitter value and send jitter result information based on the accumulated jitter value.

Aspects of the present disclosure include a method for analyzing a window of samples at an expected position of a plurality of input edges of a plurality of input waveforms, detecting the plurality of input edges, measuring a displacement of each input edge, with respect to a previous position, of the plurality of input edges, generating a value of the displacement of each input edge, incrementing a corresponding counter value of a plurality of accumulator values in response to each value of the displacement of a corresponding accumulator of the plurality of accumulators, normalizing the plurality of accumulator values, generating the plurality of accumulator values, summing the plurality of accumulator values output by the plurality of accumulators to generate an accumulated jitter value, and sending jitter result information based on the accumulated jitter value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
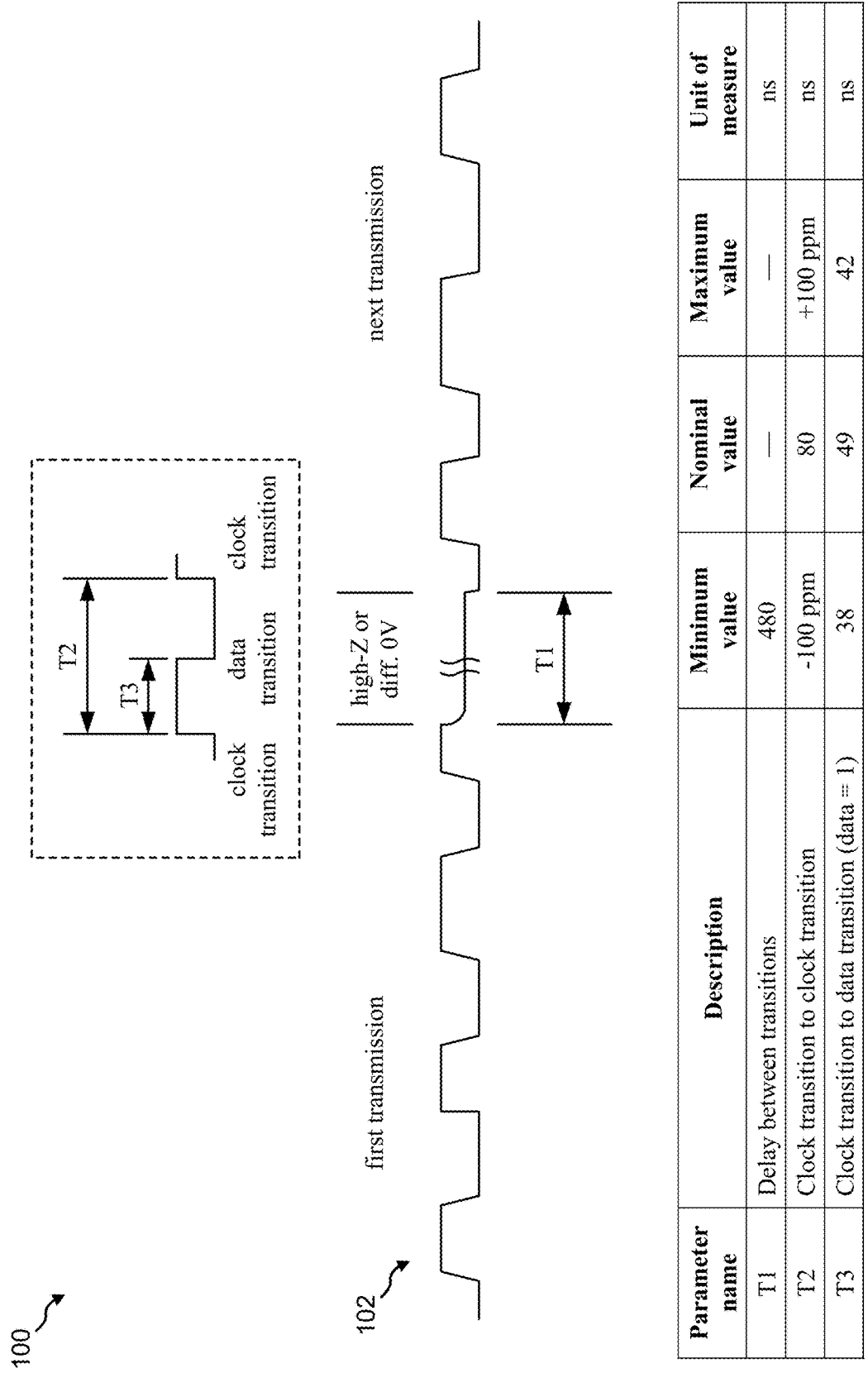
FIG. 1 is a diagram of a signal over time of an example of a Differential Manchester Encoding scheme, including an inset having a portion of the signal and defining clock and data transitions, and further including a table defining associated timing parameters and example corresponding representative values, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure include a technique to measure signal quality. Specifically, the technique includes measuring signal movement in the time domain by measuring shifts of a rising edge or a falling edge of a signal with respect to the position of a previous sample.

In some instances, aspects of the present disclosure relate to measuring the quality of the 10BASE-T1S Differential Manchester Encoding (DME) signal present at the Media Dependent Interface. The Data may be scrambled and 4B5B encoded. The DME encoding scheme may include a "clock transition" that is generated at the start of each bit and a "data transition" in the middle of a nominal bit period shall be generated if the bit to be transmitted is a logical '1'. Otherwise, no transition shall be generated until the next bit.

In certain aspects, a communication interface may include one or more pins for exchanging data. The one or more pins may be allocated for transmission, reception, energy detection, and/or other purposes.

In some instances, a receiver may be split between two dies, including a high voltage (HV) die and a low voltage (LV) die. The HV die may be used for analog related circuitry of the transmitter and/or receiver. The LV die may implement digital functionalities relating to the transmitter and/or the receiver. The interface between the HV die and the LV die may be standardized and include a predetermined number of pins. For example, the interface may include a transmit (TX) pin, a receive (RX) pin, and an energy detection (ED) pin. Other numbers and types of pins may also be implemented according to aspects of the present disclosure.

In some aspects of the present disclosure, the differential DME input may be sliced at an RX and ED programmable threshold. The differential DME input sliced signal may be sampled using both edges of a reference clock. Depending on the clock frequency and/or the sampling rate, the signal may be sampled at different frequencies.

In one example, the system may utilize a 100 Megahertz (MHz) reference clock and using both edges of the reference clock. This may produce an effective sampling rate of 200 MHz or higher (i.e., 5 nanosecond (ns) or shorter period). The optimal sampling point may be selected by the receiver logic during the frame preamble detection. The sampling position is updated during frame reception to compensate for frequency drift between sender and receiver reference clocks (e.g., +/−100 parts per million (ppm)). The jitter measurement block may track the movement of the DME symbol clock/data edge from symbol to symbol. The quantized amplitude of the movement (e.g., 5 ns, 10 ns, 15 ns, 20 ns, or other values) may be accumulated over a received data set (for example, based on physical level collision avoidance (PLCA) slot selection). The short term accumulated results may be provided to a lossy integrator to track the longer term trend of the jitter. The jitter information (long term or short term) may be used to report the amount of jitter of the signal.

In some aspects, the term drift may refer to a shift of a waveform in the time domain. The term jitter may refer to changes in periodicity of the waveform. Aspects of the present disclosure include measuring jitter in a waveform.

Referring to FIG. 1, an example of a DME encoding scheme 100 includes a clock transition that occurs at the rising edge of the waveform 102 representing a first transmission and a next transmission of the DME signal. T1 may be the delay between transitions. T2 may be the time between two neighboring clock transitions. T3 may be the time between a clock transition and a neighboring data transition.

Figure 2:
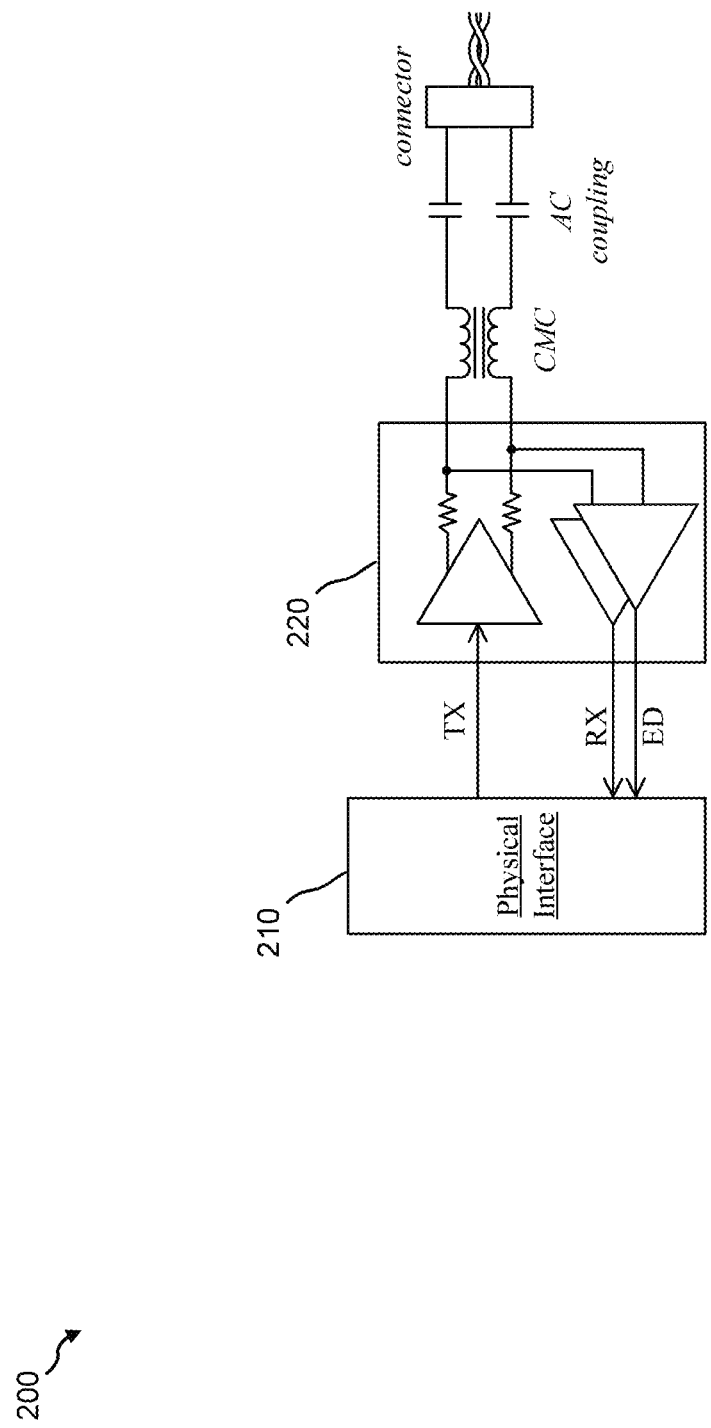
FIG. 2 is a combined schematic and block diagram of an example of a network according to aspects of the present disclosure.

Referring to FIG. 2, an example of a network 200 according to aspects of the present disclosure includes a physical interface 210 configured to interconnect two or more network devices. The network 200 may include a transceiver integrated circuit (IC) 220, such as a physical medium dependent IC, configured to transmit and/or receive data. The physical interface 210 may receive the RX line and the ED line. The signal quality may be measured by measuring one or both of the RX line and the ED line.

Figure 3:
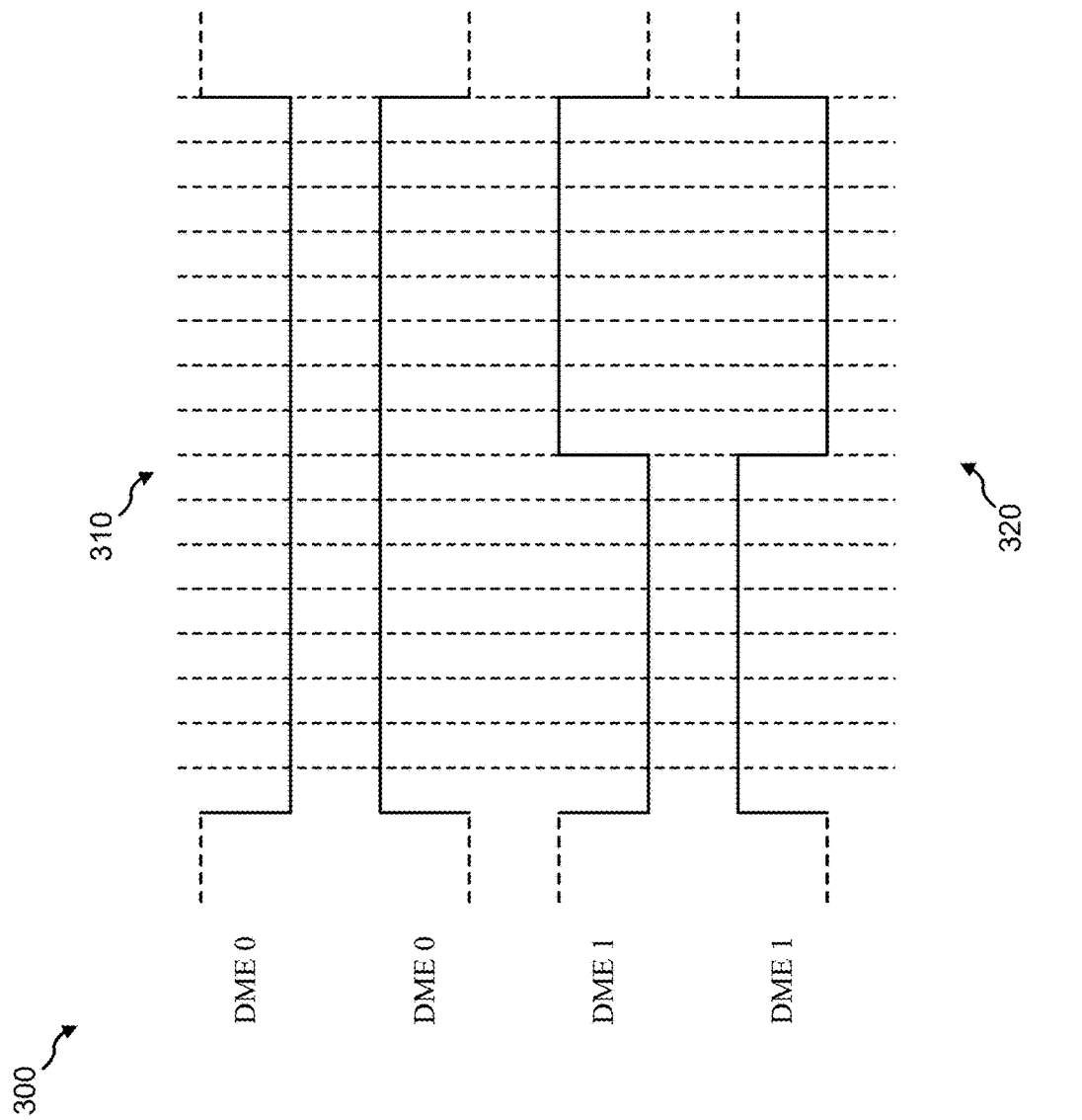
FIG. 3 is a graph of an example of a Differential Manchester Encoding signal over time, without jitter, according to aspects of the present disclosure.

Referring to FIG. 3, an example of DME signals 300 without jitter may be detected according to aspects of the present disclosure. If no jitter or drift is present on the sampled signal, the detected DME edge locations will not move over time after the initial sampling phase position has been selected. The initial sampling phase position may be selected by the receiver based on detection of a fixed format preamble. The DME signals 300 may utilize the presence or absence of signal level transitions (e.g., from low to high or high to low) to signal logical values. In FIG. 3, a first waveform 310 of the DME signals 300 may be associated with a first logic value (e.g., 0 or 1). Here, the first waveform 310 may lack a signal level transition. This waveform may be interpreted as the first logic value. A second waveform 320 may include a signal level transition. Therefore, the second waveform 320 may be associated with a second logic value different than the first logic value. Other implementations may also be used according to aspects of the present disclosure.

Figure 4:
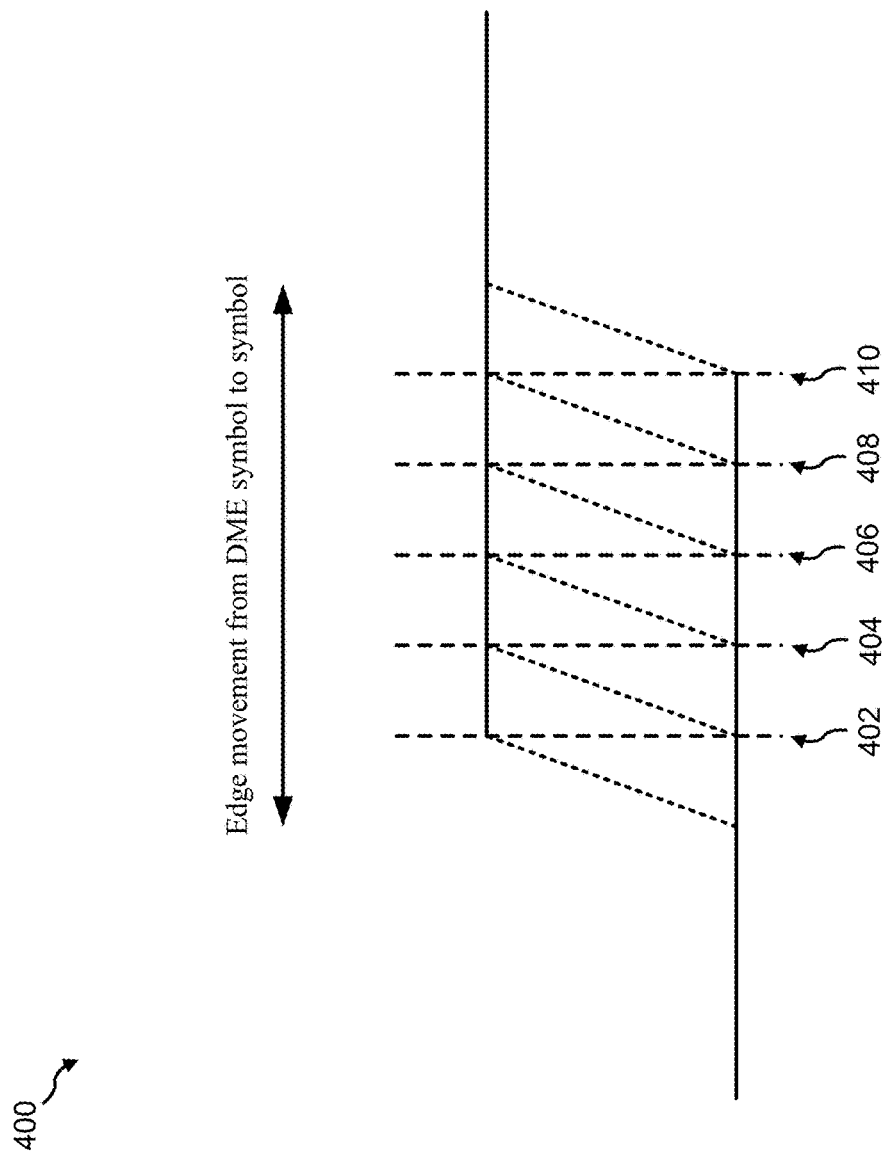
FIG. 4 is a graph of an example of movement of the DME symbol edge, leading to jitter, and corresponding adjustment of a sampling position to account for the jitter, according to aspects of the present disclosure.

Referring to FIG. 4, an example of jitter 400 in sampled signals may be detected according to aspects of the present disclosure. If drift is present (up to +/−100 ppm offset between transmitting and receiver reference clocks, as represented by the line labeled "Edge movement from DME symbol to symbol"), the sampling position may move by two sampling (200 MHz) positions over time before being corrected for by the drift compensation circuitry. This may effectively move (as represented by the diagonal dotted lines) the selected phase by two positions back to a new ideal sampling phase position. For example, the initial DME edge may be before a first position 402. Over time, the DME edge may move to different positions, such as between the first position and a second position 404, between the second position 404 and a third position 406, between the third position 406 and a fourth position 408, or between the fourth position 408 and a fifth position 410. The DME edge may move back to the initial position (i.e., before the first position 402) after drift compensation (discussed below). In some instances, edge movements due to drift as described above may be masked and not accumulated.

In some aspects, if noise is present, the phase location of the DME edges may move relative to the receiver selected sampling phase from symbol to symbol. This movement may be accumulated in separate banks according to the magnitude of the DME edge movement (e.g., bank A=5 ns, bank B=10 ns . . . ). If drift is also present, it will cause some quantity to be accumulated in the bank that tracks the smallest quantization DME symbol to symbol movement. Averaging this drift movement and/or noise movement over time will provide a clear picture of the actual noise present in the received signal.

Figure 5:
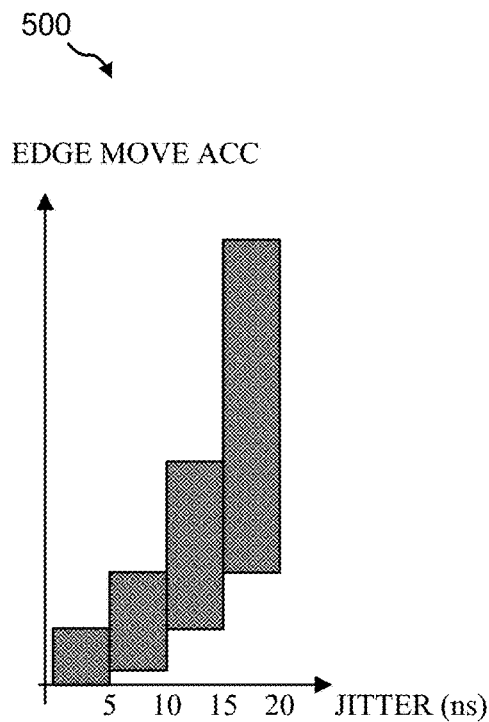
FIG. 5 includes two graphs, namely a first graph of edge movement accumulator value over amount of jitter present on the line and a second graph of edge movement accumulator values in different scenarios, illustrating examples of accumulated drift and jitter measurement distribution according to aspects of the present disclosure.
Figure 5:
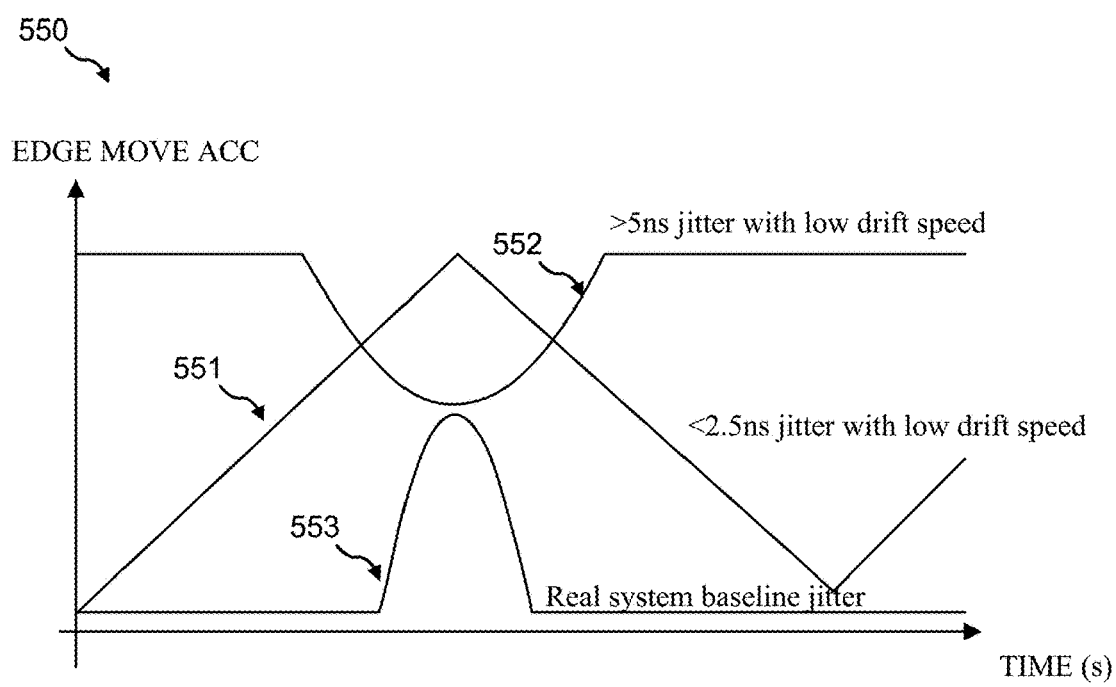

Referring to FIG. 5, a first graph 500 shows an example of accumulated drift, and second graph 550 shows an example of distribution of jitter measurement in a real system. Graph 500 shows a histogram of the edge movement accumulator. As the jitter in the system increases the combined accumulator value increases. The graph also depicts the scaling applied based on how big the edge jump was. Accumulator movement may be accumulated in separate banks according to its magnitude and the combined metric can assign different values for each one of the banks (e.g., the contribution of the 15 ns bank that shows a large amount of jitter can be scaled by a higher value while a jump of only one sampling period recorded in the 5 ns bank is left unscaled). Graph 550 shows how different noise profiles should produce different combined accumulator profiles. Profiles depicted in the graph might not be to scale. Profile 551 shows that even for a very low noise system (>2.5 ns) there will be a noise peak when the clocks drift past each other. In this case, the profile is dominated by the jitter generated by the clock drift and its response will be cyclic as the clock phases lock and unlock where the period of the cycle is determined by the ratio between the frequencies of the transmitting and receiving clocks. Profile 552 shows a system where the jitter is large enough to dominate the combined accumulator value. In this case, the profile could have an impact when the clock drift causes the maximum phase deviation between the transmitting and receiving clocks, but it would return to the expected value once that influence is reduced or compensated. Profile 553 shows the profile for a system with a high drift speed and subject to a single jitter event. In this case, the influence of the clock drift is insignificant and the profile is dominated by the jitter measurement. If the max accumulated value is looked at over multiple frames the devices will drift past possible positions, thus giving a good representation of the actual jitter present. The jitter measurement for each bank of data may be filtered over a larger sample size to obtain an accurate result. The drift compensation block might mitigate the impact of clock drift between transmitting and receiving clocks. To normalize the jitter measurement, it may be calculated for a fixed bank size, and/or be normalized in a per-frame basis using the number of symbols received in each frame. Other methods of measurements may also be used according to aspects of the present disclosure.

Figure 6:
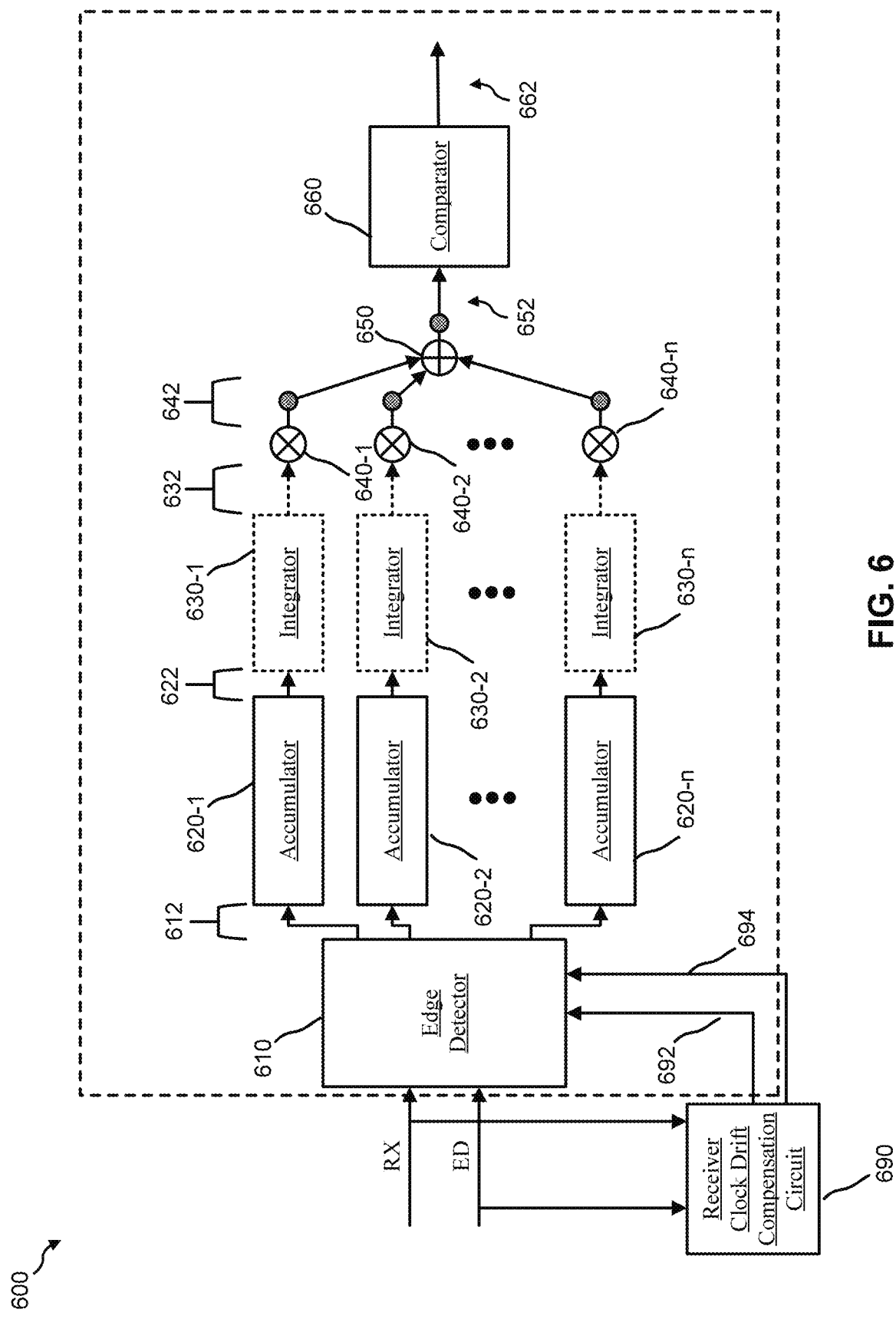
FIG. 6 is a schematic circuit diagram of an example of a jitter measurement circuit according to aspects of the present disclosure.

Referring to FIG. 6, an example of a jitter measurement circuit 600 according to aspects of the present disclosure includes an edge detector 610 configured to receive a reception (RX) signal and an energy detection (ED) signal. The edge detector 610 may be configured measure a shift of an edge based on the RX signal and the ED signal (e.g., an edge of a DME waveform). In one example, the edge detector 610 may be configured to analyze a sampling window, at an expected position of input edges of waveforms to detect the input edges. The edge detector 610 may be configured to measure a displacement associated with each input edge with respect to the position of input edges in the previous sampling window. The edge detector 610 may be configured to output the values of the displacement 612 associated with the input edges based on the measurement. The edge detector 610 may be configured to operate in a per-frame basis and the output values of the displacement 612 may be normalized using the number of symbols analyzed during the frame reception.

In some aspects of the present disclosure, the circuit 600 may include a plurality of accumulators 620-1, 620-2 . . . 620-n each configured to receive a corresponding value of displacement 612 from the edge detector 610. In the current application, the value of n may be any positive integer (e.g., 4). In response to the corresponding value of displacement 612, each of the plurality of accumulators 620-1, 620-2 . . . 620-n may be configured to increment a corresponding counter value to track a number of edge displacement for each displacement distance. The plurality of accumulators 620-1, 620-2 . . . 620-n may be configured to output accumulator values 622 associated with the number of edge displacements.

In one aspect of the present disclosure, the circuit 600 may optionally include a plurality of integrators 630-1, 630-2 . . . 630-n, where n is a positive integer, configured to control/extend a duration of measurement associated with the jitter measurement. The plurality of integrators 630-1, 630-2 . . . 630-n may be configured to receive the accumulator values 622 and output integrated accumulator values 632 associated with repeated jitter measurements of multiple RX and ED signals.

In some aspects of the present disclosure, the plurality of accumulators 620-1, 620-2 . . . 620-n and/or the plurality of integrators 630-1, 630-2 . . . 630-n may normalize the corresponding counter values and/or the numbers of edge displacement. The normalization may be performed by dividing a corresponding counter value by a number of measurements taken. For example, one of the plurality of accumulators 620-1, 620-2 . . . 620-n may count 10 occurrences of a particular edge displacement over 100 measurements, and output a normalized counter value of 0.1. Other methods of normalization may also be implemented according to aspects of the present disclosure.

In certain aspects of the present disclosure, the circuit 600 may include a plurality of amplifiers 640-1, 640-2 . . . 640-n, where n is a positive integer, configured to apply gains to the signals of the accumulator values 622 and/or the signals of the integrated accumulator values 632. Each of the plurality of amplifiers 640-1, 640-2 . . . 640-n may apply the same or different gains as the remaining amplifiers of the plurality of amplifiers 640-1, 640-2 . . . 640-n. The plurality of amplifiers 640-1, 640-2 . . . 640-n may be configured to output amplified signals 642.

In some aspects of the present disclosure, the circuit 600 may include a summation circuit 650 configured to sum the amplified signals 642 to generate an accumulated jitter value 652. The summation circuit 650 may be configured to output the accumulated jitter value 652.

In one aspect of the present disclosure, the circuit 600 may include a comparator 660 configured to receive the accumulated jitter value 652. The comparator 660 may be configured to compare the accumulated jitter value 652 with a threshold value to determine jitter result information 662. In one aspect, the comparator 660 may be configured to output the jitter result information 662.

In optional aspects of the present disclosure, the circuit 600 may include a receiver clock drift compensation circuit 690. The receiver clock drift compensation circuit 690 may be configured to provide drift compensation 692 and receive sampling phase 694 information, based on input edge information from RX and/or ED signals with the intention to correct influence of asynchronous sampling and clock deviations between the internal receiver clock and the transmitter clock (from the source device in the network), to the edge detector. During operation, the edge detector 610 may receive the RX signal and/or the ED signal. The RX signal and/or the ED signals may include one or more symbols. The edge detector 610 may detect any shift of the edge associated with the one or more symbols based on the RX signal and/or the ED signal. In one aspect, the shift may be quantized. Specifically, the shift may be quantized as a number of positions as shown in FIG. 4. As such, any shift from the baseline edge may be quantified as shift of 1 position, 2 positions, etc.

In some aspects, the edge detector 610 may output the values of displacement 612 associated with the one or more symbols. Each of the values of displacement 612 may be associated with a certain number of positions shifted. For example, the circuit 600 may be configured to detect shifts up to 4 positions (i.e., n=4). A first symbol embedded in the RX and ED signals may have a first shift of 2 positions. As such, the edge detector 610 may detect the first shift, and transmit a corresponding value of displacement of the values of displacement 612 to the second accumulator 620-2 of the plurality of accumulators 620-1, 620-2 . . . 620-n to indicate one "count" of a shift associated with 2 drift positions. A second symbol embedded in the RX and ED signals may have a second shift of 4 positions. The edge detector 610 may detect the second shift, and transmit a corresponding value of displacement of the values of displacement 612 to a fourth accumulator 620-4 of the plurality of accumulators 620-1, 620-2 . . . 620-n to indicate one "count" of a shift associated with 4 drift positions. These values may be recorded for the whole duration of a transmission (i.e. a frame, since it is the minimum amount of meaningful data involved in an interaction between nodes in the network), normalized in a per-frame basis using the number of symbols, and the values of displacement 612 transmitted to the accumulators.

In certain aspects, the plurality of accumulators 620-1, 620-2 . . . 620-n may receive the values of displacement 612. The plurality of accumulators 620-1, 620-2 . . . 620-n may output accumulator values 622 indicating the counts of shifts associated with each position of drift based on the values of displacement 612. For example, in the example above, the second accumulator 620-2 and the fourth accumulator 620-4 may each output a value of 1 indicating the first shift associated with 2 drift positions and 4 drift positions, respectively.

In some aspects, the plurality of integrators 630-1, 630-2 . . . 630-n may integrate accumulator values 622 for the symbols in the RX and ED signals. The integration may occur over a period of time and/or a number of symbols. The integration may cover a number of symbols to sample the average drifts of the number of symbols. The plurality of integrators 630-1, 630-2 . . . 630-n may output the integrated accumulator values 632.

In one aspect of the present disclosure, the plurality of amplifiers 640-1, 640-2 . . . 640-n may receive the integrated accumulator values 632 and amplify each of the integrated accumulator values 632. Each of the plurality of amplifiers 640-1, 640-2 . . . 640-n may amplify the corresponding integrated accumulator value of the integrated accumulator values 632 the same or differently (i.e., different gains for different amplifiers). The plurality of amplifiers 640-1, 640-2 . . . 640-n may output the amplified signals 642.

In certain aspects, the summation circuit 650 may sum the amplified signals 642 to generate the accumulated jitter value 652. The summation circuit 650 may output the accumulated jitter value 652.

In some aspects of the present disclosure, the comparator 660 may compare the accumulated jitter value 652 to a threshold value to determine the jitter result information 662.

In some aspects of the present disclosure, each the plurality of integrators 630-1, 630-2 . . . 630-n may be implemented as a leaky integrator. The leaky integrator may be defined by a specific differential equation, used to describe a component or system that takes the integral of an input, but gradually leaks a small amount of input over time. In some examples, each the plurality of integrators 630-1, 630-2 . . . 630-n may be implemented as an infinite impulse response (IIR) filter. The power correlation metric may be registered in the leaky integrator. The decay rate may begin at 1 to initialize the integrator and decreases until the maximum shift. A time constant may be used in each the plurality of integrators 630-1, 630-2 . . . 630-n . . . . The output value of the integrator may be compared to a threshold in order to distinguish between signal quality index (SQI) levels.

Figure 7:
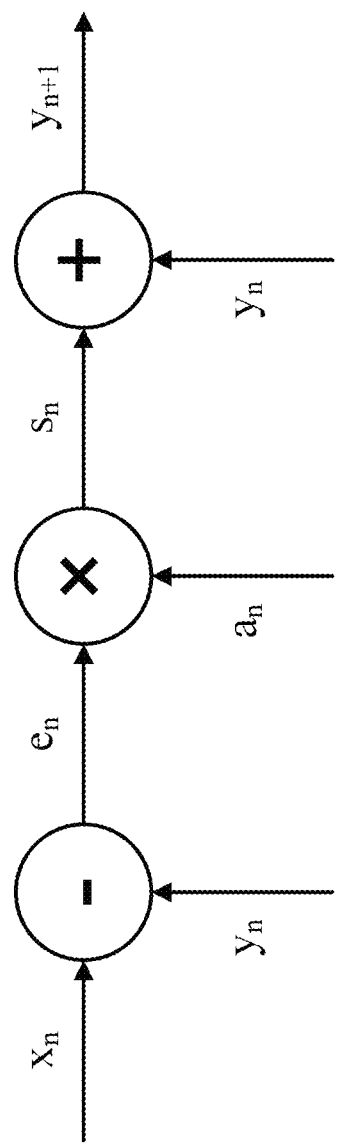
FIG. 7 is a schematic circuit diagram of an example of a leaky integrator according to aspects of the present disclosure.

Referring to FIG. 7, an example of a leaky integrator 700 may be represented by the equation $y_{n+1}=a_n(x_n-y_n)+y_n=(1-a_n)y_n+a_nx_n$. The parameter $x_n$ is the power metric, $a_n=2^{-b}\leq 1$ where $a_n$ is the decay rate, and $y_n$ is the integrator value. In the expression above, if x>y and e>0, then y increases. If x<y and e<0, then y decreases. Other models may also be used to implement the plurality of integrators 630 (FIG. 6) according to aspects of the present disclosure.

Figure 8A:
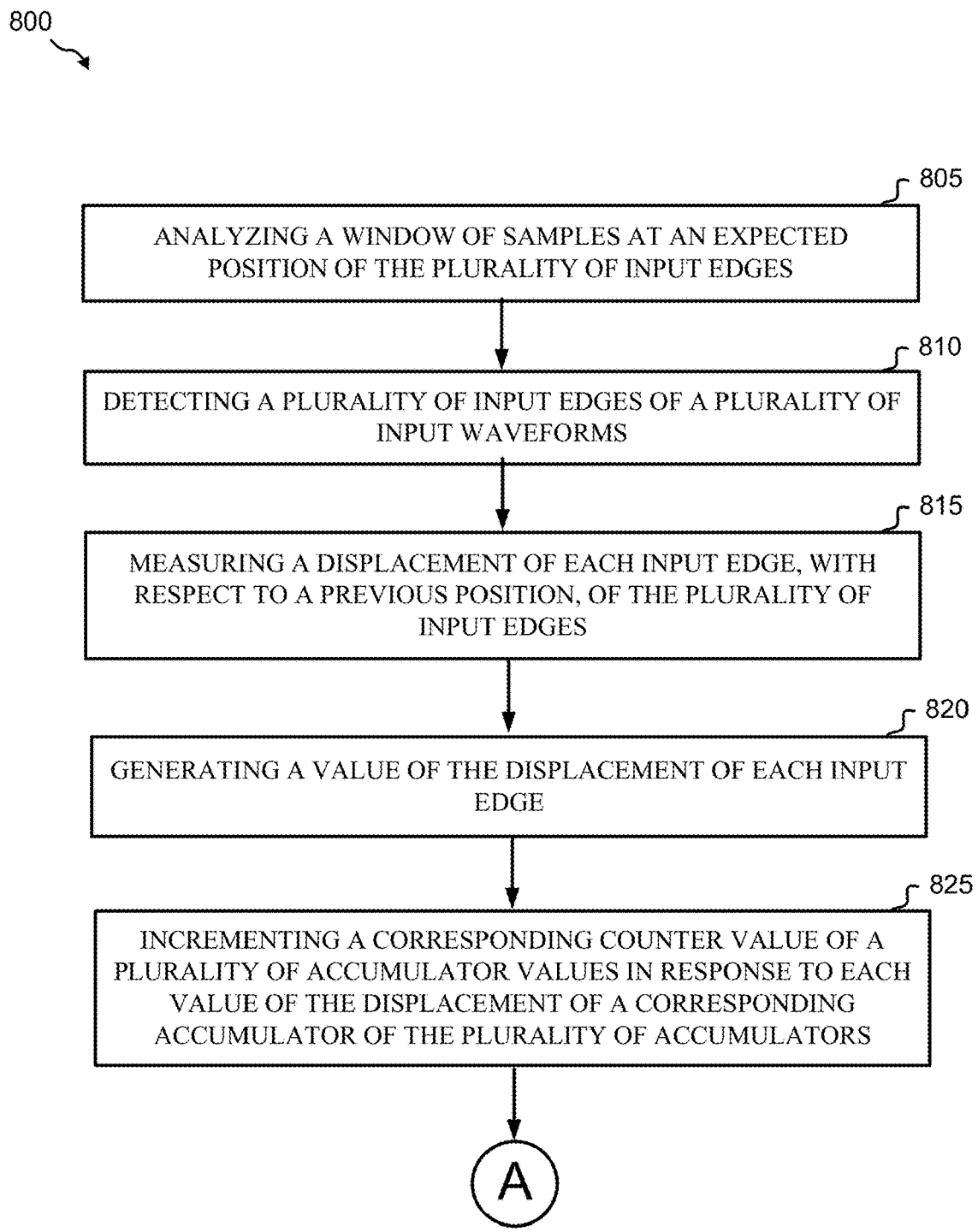
FIGS. 8A-B are a flowchart of an example of a method for measuring jitter according to aspects of the present disclosure.
Figure 8B:
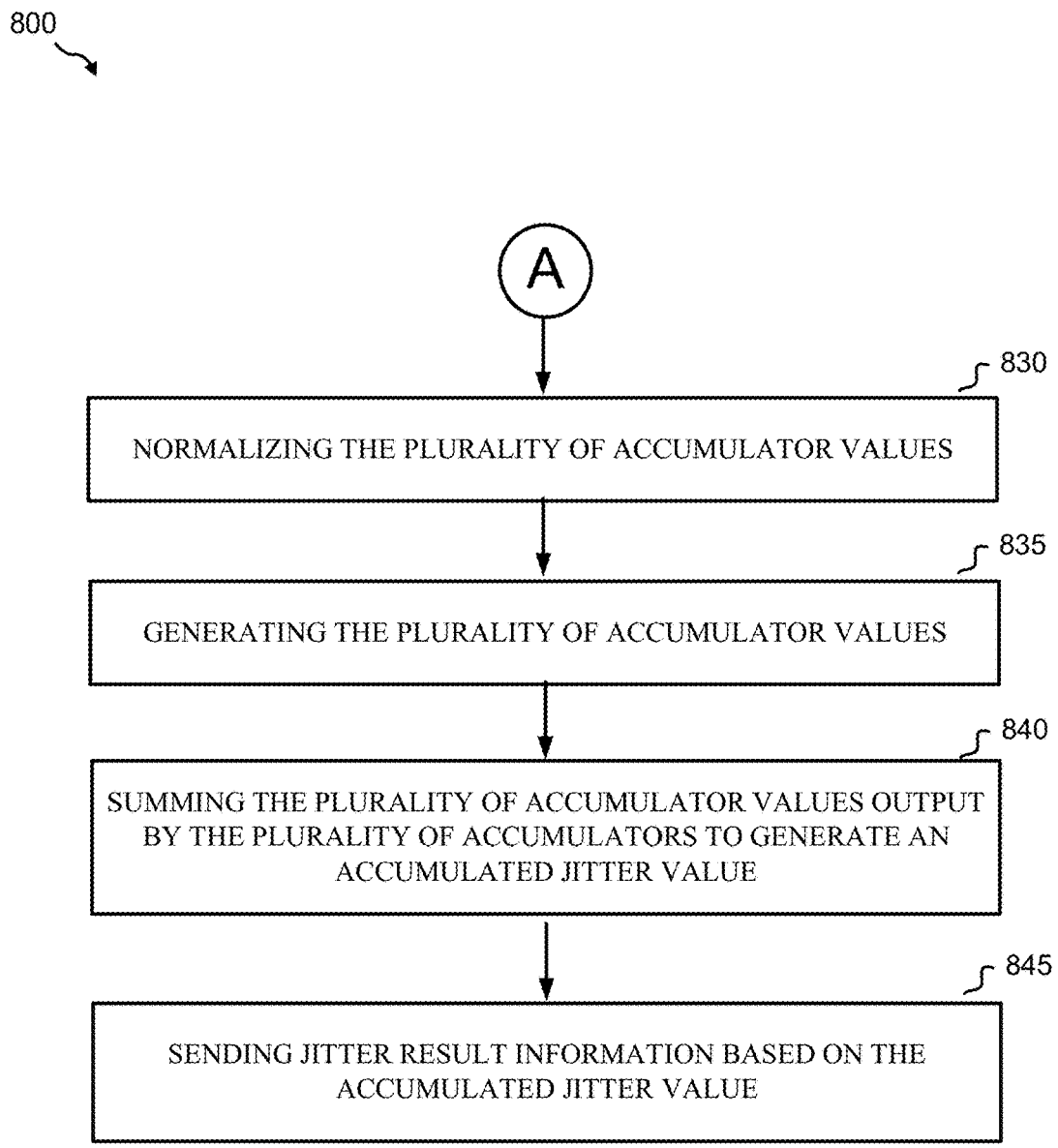

Referring to FIGS. 8A-B, a method 800 of an example of measuring jitter according to aspects of the present disclosure may be implemented by the jitter measurement circuit 600 and/or one or more subcomponents of the circuit 600.

At 805, the method 800 may analyze a window of samples at an expected position of the plurality of input edges. For example, the jitter measurement circuit 600 and/or the edge detector 610 may be configured to, and/or define means for analyzing a window of samples at an expected position of the plurality of input edges.

At 810, the method 800 may detect a plurality of input edges of a plurality of input waveforms. For example, the jitter measurement circuit 600 and/or the edge detector 610 may be configured to, and/or define means for detecting a plurality of input edges of a plurality of input waveforms.

At 815, the method 800 may measure a displacement of each input edge, with respect to a previous position, of the plurality of input edges. For example, the jitter measurement circuit 600 and/or the edge detector 610 may be configured to, and/or define means for measuring a displacement of each input edge, with respect to a previous position, of the plurality of input edges.

At 820, the method 800 may generate a value of the displacement of each input edge. For example, the jitter measurement circuit 600 and/or the edge detector 610 may be configured to, and/or define means for generating a value of the displacement of each input edge.

At 825, the method 800 may increment a corresponding counter value of a plurality of accumulator values in response to each value of the displacement of a corresponding accumulator of the plurality of accumulators. For example, the jitter measurement circuit 600 and/or the plurality of accumulators 620-1, 620-2 . . . 620-n may be configured to, and/or define means for incrementing a corresponding counter value of a plurality of accumulator values in response to each value of the displacement of a corresponding accumulator of the plurality of accumulators.

At 830, the method 800 may optionally normalize the plurality of accumulator values. For example, the jitter measurement circuit 600 may be configured to normalize the accumulator values using the number of symbols used to generate them (i.e. received frame length).

At 835, the method 800 may generate the plurality of accumulator values. For example, the jitter measurement circuit 600 and/or the plurality of accumulators 620-1, 620-2 . . . 620-n may be configured to, and/or define means for generating the plurality of accumulator values.

At 840, the method 800 may sum the plurality of accumulator values output by the plurality of accumulators to generate an accumulated jitter value. For example, the jitter measurement circuit 600 and/or the summation circuit 650 may be configured to, and/or define means for summing the plurality of accumulator values output by the plurality of accumulators to generate an accumulated jitter value.

At 845, the method 800 may send jitter result information based on the accumulated jitter value. For example, the jitter measurement circuit 600 and/or the comparator 660 may be configured to, and/or define means for sending jitter result information based on the accumulated jitter value.

In summary, implementations of the present disclosure may include one or any combination of the following aspects.

Aspects of the present disclosure include a method for analyzing a window of samples at an expected position of a plurality of input edges of a plurality of input waveforms, detecting the plurality of input edges, measuring a displacement of each input edge, with respect to a previous position, of the plurality of input edges, generating a value of the displacement of each input edge, incrementing a corresponding counter value of a plurality of accumulator values in response to each value of the displacement of a corresponding accumulator of the plurality of accumulators, normalizing the plurality of accumulator values, generating the plurality of accumulator values, summing the plurality of accumulator values output by the plurality of accumulators to generate an accumulated jitter value, and sending jitter result information based on the accumulated jitter value.

Aspects of the present disclosure include the method above, further comprises receiving a reception signal and an energy detection signal to generate the plurality of input waveforms.

Aspects of the present disclosure include any of the methods above, further comprising decoding a Differential Manchester Encoding coding scheme on the reception signal and the energy detection signal.

Aspects of the present disclosure include any of the methods above, further comprising extending a duration of measurement associated with the jitter.

Aspects of the present disclosure include any of the methods above, further comprising applying a gain to at least one of the plurality of accumulator values.

Aspects of the present disclosure include any of the methods above, further comprises comparing the accumulated jitter value to a threshold noise value and outputting the jitter result information based on comparing the accumulated jitter value to the threshold noise value.

Aspects of the present disclosure include any of the methods above, further comprising correcting for drift of a plurality of incoming input waveforms due to asynchronous sampling.

Aspects of the present disclosure include any of the methods above, further comprising shifting the window of samples with respect to a plurality of incoming input edges of a plurality of incoming input waveforms based on input edge information.

Aspects of the present disclosure include any of the methods above, wherein the plurality of input edges include at least one of rising edges or falling edges.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A circuit for measuring jitter, the circuit comprising:
    an edge detector circuit configured to:
        analyze a window of samples at an expected position of a plurality of input edges of a plurality of input waveforms, and
        detect the plurality of input edges;
    a movement counter circuit configured to:
        measure a displacement of each input edge, with respect to a previous position, of the plurality of input edges, and
        output a value of the displacement of each input edge;
    a plurality of accumulators each configured to:
        increment a corresponding counter value of a plurality of accumulator values in response to each value of the displacement of a corresponding accumulator of the plurality of accumulators, and
        output the plurality of accumulator values; and
    a summation circuit configured to:
        sum the plurality of accumulator values output by the plurality of accumulators to generate an accumulated jitter value, and
        send jitter result information based on the accumulated jitter value.

2. The circuit of claim 1, wherein the edge detector circuit comprises a reception terminal configured to receive a reception signal and an energy detection terminal configured to receive an energy detection signal to generate the plurality of input waveforms.

3. The circuit of claim 2, wherein the edge detector circuit is further configured to decode a Differential Manchester Encoding coding scheme on the reception signal and the energy detection signal.

4. The circuit of claim 1, further comprising a plurality of integrators coupled with the plurality of accumulators and configured to extend a duration of measurement associated with the jitter.

5. The circuit of claim 1, wherein the plurality of accumulators are further configured to normalize the plurality of accumulator values before outputting the plurality of accumulator values.

6. The circuit of claim 1, further comprising an amplifier configured to apply a gain to at least one of the plurality of accumulator values prior to receipt by the summation circuit.

7. The circuit of claim 1, further comprising a respective one of a plurality of amplifiers configured to apply a respective one of a plurality of different gains to a corresponding one of the plurality of accumulator values prior to receipt by the summation circuit.

8. The circuit of claim 1, further comprising a noise threshold comparator configured to:
    receive the accumulated jitter value;
    compare the accumulated jitter value to a threshold noise value; and
    output the jitter result information based on comparing the accumulated jitter value to the threshold noise value.

9. The circuit of claim 1, further comprising a drift compensation circuit configured to correct for drift of a plurality of incoming input waveforms due to asynchronous sampling.

10. The circuit of claim 1, further comprising the movement counter circuit is further configured to shift the window of samples with respect to a plurality of incoming input edges of a plurality of incoming input waveforms based on input edge information.

11. The circuit of claim 1, wherein the plurality of input edges include at least one of rising edges or falling edges.

12. A method of measuring jitter, the method comprising:
    analyzing a window of samples at an expected position of a plurality of input edges of a plurality of input waveforms;
    detecting the plurality of input edges;
    measuring a displacement of each input edge, with respect to a previous position, of the plurality of input edges;
    generating a value of the displacement of each input edge;
    incrementing a corresponding counter value of a plurality of accumulator values in response to each value of the displacement of a corresponding accumulator of a plurality of accumulators;

generating the plurality of accumulator values;
summing the plurality of accumulator values output by the plurality of accumulators to generate an accumulated jitter value; and
sending jitter result information based on the accumulated jitter value.

13. The method of claim 12, further comprising receiving a reception signal and an energy detection signal to generate the plurality of input waveforms.

14. The method of claim 13, further comprising decoding a Differential Manchester Encoding coding scheme on the reception signal and the energy detection signal.

15. The method of claim 12, further comprising extending a duration of measurement associated with the jitter.

16. The method of claim 12, further comprising applying a gain to at least one of the plurality of accumulator values.

17. The method of claim 12, further comprising:
comparing the accumulated jitter value to a threshold noise value; and
outputting the jitter result information based on comparing the accumulated jitter value to the threshold noise value.

18. The method of claim 12, further comprising correcting for drift of a plurality of incoming input waveforms due to asynchronous sampling.

19. The method of claim 12, further comprising shifting the window of samples with respect to a plurality of incoming input edges of a plurality of incoming input waveforms based on input edge information.

20. The method of claim 12, wherein the plurality of input edges include at least one of rising edges or falling edges.

* * * * *